United States Patent
Tremblay et al.

(10) Patent No.: US 9,421,878 B2
(45) Date of Patent: Aug. 23, 2016

(54) ELECTRIC VEHICLE CHARGING STATION AND METHOD FOR CHARGING AN ELECTRIC VEHICLE

(75) Inventors: Louis Tremblay, Quebec (CA); Michael Desjardins, Quebec (CA)

(73) Assignee: ADDENERGIE TECHNOLOGIES INC., Quebec (CA)

( * ) Notice: Subject to any disclaimer, the term of this patent is extended or adjusted under 35 U.S.C. 154(b) by 552 days.

(21) Appl. No.: 13/822,730

(22) PCT Filed: Sep. 12, 2011

(86) PCT No.: PCT/CA2011/001019
§ 371 (c)(1),
(2), (4) Date: Mar. 13, 2013

(87) PCT Pub. No.: WO2012/034216
PCT Pub. Date: Mar. 22, 2012

(65) Prior Publication Data
US 2013/0181674 A1  Jul. 18, 2013

Related U.S. Application Data

(60) Provisional application No. 61/382,102, filed on Sep. 13, 2010.

(51) Int. Cl.
*H02J 7/00* (2006.01)
*B60L 11/18* (2006.01)
(Continued)

(52) U.S. Cl.
CPC ......... *B60L 11/1824* (2013.01); *B60L 11/1818* (2013.01); *B60L 11/1825* (2013.01); *H01R 13/447* (2013.01); *H01R 13/6397* (2013.01);
(Continued)

(58) Field of Classification Search
CPC ........... B60L 11/1818; B60L 11/1824; B60L 11/1825; H02J 7/0042; H01R 13/447; H01R 13/6397; Y02T 10/7088; Y02T 90/121; Y02T 90/14
USPC .......................................................... 320/109
See application file for complete search history.

(56) References Cited

U.S. PATENT DOCUMENTS 5,306,999 A * 4/1994 Hoffman ....................... 320/109
5,344,330 A    9/1994 Hoffman
(Continued)

OTHER PUBLICATIONS

"EV Charging Primer," AeroVironment, Inc., EV Solutions™ Electric Vehicle Charging Products and Services, Monrovia, CA 91016, 2010, www.avinc.com/evsolutions_fleet.
(Continued)

*Primary Examiner* — Nathaniel Pelton
(74) *Attorney, Agent, or Firm* — Pearl Cohen Zedek Latzer Baratz LLP

(57) ABSTRACT

There is described an electric vehicle charging station for charging an electric vehicle, comprising: an electrical connector electrically connectable to a source of electrical energy, the electrical connector adapted for connecting to a battery of the electric vehicle; a frame having a connector receiving portion for receiving the electrical connector; a locking unit mounted to the frame for preventing a user access to the electrical connector; and a control unit operatively connected to the locking unit, the control unit for verifying rights of a user to access the electrical connector and unlocking the locking unit upon successful verification of the user rights to provide the user access to the electrical connector.

14 Claims, 7 Drawing Sheets

(51) Int. Cl.
*H01R 13/447* (2006.01)
*H01R 13/639* (2006.01)

(52) U.S. Cl.
CPC .......... *B60L 2230/12* (2013.01); *Y02T 10/7005* (2013.01); *Y02T 10/7088* (2013.01); *Y02T 90/121* (2013.01); *Y02T 90/128* (2013.01); *Y02T 90/14* (2013.01)

(56) References Cited

U.S. PATENT DOCUMENTS

| | | | | |
|---|---|---|---|---|
| 7,804,274 | B2* | 9/2010 | Baxter et al. | 320/109 |
| 2009/0174365 | A1 | 7/2009 | Lowenthal | |
| 2009/0177580 | A1 | 7/2009 | Lowenthal | |
| 2010/0013433 | A1 | 1/2010 | Baxter | |
| 2010/0013436 | A1 | 1/2010 | Lowenthal | |
| 2010/0194529 | A1 | 8/2010 | Yamamoto | |
| 2011/0074351 | A1* | 3/2011 | Bianco et al. | 320/109 |

OTHER PUBLICATIONS

"User's Manual, Model CS-100," ClipperCreek, Inc, Auburn, CA, 2009, www.ClipperCreek.com.

Chris Outwater. "Pay-By-Phone Electric Vehicle Charging," Liberty Access Technologies, Liberty Plugins, Inc., Jan. 2013, www.libertyplugins.com.

"Standard EVSE Pedestal Installation Guide," ClipperCreek, Inc., Auburn, CA, Nov. 2009, www.ClipperCreek.net.

Chris Outwater. Workplace Electric Vehicle Charging Liberty Access Technologies, Liberty Plugins, Inc., Feb. 2013, www.libertyplugins.com.

"ChargePoint Networked Charging Stations—CT2000 and CT2100 Families," Coulomb Technologies, Inc. Campbell, CA, 2010, www.mychargepoint.net.

"Ready for the Future of Transport—Elektrobay," Elektromotive, East Sussex, UK, 2009, www.elektromotive.com.

ChargePoint, Inc. Profile, Hoover's, Mar. 14, 2013.

"ChargePoint Networked Charging Stations—CT1000 Family," Coulomb Technologies, Inc. Campbell, CA, 2010, www.mychargepoint.net.

"ChargePoint Networked Charging Stations—CT2000 Family," Coulomb Technologies, Inc. Campbell, CA, 2010, www.mychargepoint.net.

Gary Eldridge, P.E. "Safety of Electric Vehicle Supply Equipment (EVSE)," Coulomb Technologies, Inc. Jul. 6, 2010.

International Search Report for International Application No. PCT/CA2011/001019 mailed Dec. 5, 2011.

* cited by examiner

ELECTRIC VEHICLE CHARGING STATION AND METHOD FOR CHARGING AN ELECTRIC VEHICLE

CROSS REFERENCE TO RELATED APPLICATION

This application is a National Phase Application of PCT International Application No. PCT/CA2011/001019, International Filing Date Sep. 12, 2011, which claims priority of US Provisional Patent Application No. 61/382,102, which was filed on Sep. 13, 2010 and is entitled "ELECTRIC VEHICLE CHARGING STATION AND METHOD FOR CHARGING AN ELECTRIC VEHICLE", the specification of which is hereby incorporated by reference.

FIELD OF THE INVENTION

This invention relates to the field of charging station for electric vehicles, and more particularly to charging stations having user access control capabilities.

BACKGROUND OF THE INVENTION

Electrical vehicles provided with rechargeable batteries become widely used. Typically, the user recharges the electric batteries of his vehicle in connecting the batteries to the power grid via a suitable plug. In this case, the user generally uses the connection to the power grid that is available at his residence.

Some fully electric vehicles may not yet have an autonomy suitable for enabling the user to travel a long way without recharging the batteries, once they are depleted, to further postpone the recharging of the batteries of the vehicle. In this case, the user may have to recharge his batteries outside his residence, for example in a charging station available to the public upon payment of a fee.

Different types of charging stations and associated methods adapted for distributing electricity to electric vehicles have been proposed.

Charging stations similar to gasoline stations and adapted for public use have been proposed. In this case, the user may approach his electric car proximate the charging station as he would do with a conventional gasoline pump, present a credit card to the station or otherwise arrange for payment, operatively plug the vehicle to the charging station and be provided with electricity. After the vehicle is sufficiently charged, the amount of power provided may be calculated, and either the credit card debited for the correct amount, or other arrangements to pay for the service may be accommodated such as debiting a prepaid account.

It has been shown that charging stations may be prone to vandalism and even theft of portions of the station. For example, it is known that copper conductive cables are often targeted as copper may be sold.

Moreover, the charging stations may also be prone to various damages. For example, if a user does not replace the distributing cable in its correct position after use, the cable and associated connector may remain unprotected on the ground. The cable may then be damaged and subjected to climatic conditions.

In harsh climatic conditions such as during winter in northern countries like Canada, if the cable is not properly placed between subsequent uses, it may be running on the floor, in ice and snow and be trapped in ice. The station will then not be available for a user until an operator frees the cable from ice, which is a great limitation. Moreover, the cable may be damaged by motorized snow removal, which is also a great disadvantage.

It would therefore be desirable to provide an improved charging station that would reduce at least one of the above mentioned drawbacks. For example, it would be desirable to provide a charging station devised to resist to heavy conditions such as snow, ice, and most of debris for example, while offering an easy and convenient experience to the user.

BRIEF SUMMARY

In accordance with a broad aspect, there is described an electric vehicle charging station for charging an electric vehicle, comprising: an electrical connector electrically connectable to a source of electrical energy, the electrical connector adapted for connecting to a battery of the electric vehicle; a frame having a connector receiving portion for receiving the electrical connector; a locking unit mounted to the frame for preventing a user access to the electrical connector; and a control unit operatively connected to the locking unit, the control unit for verifying rights of a user to access the electrical connector and unlocking the locking unit upon successful verification of the user rights to provide the user access to the electrical connector.

In one embodiment, the locking unit comprises a protective cover covering the electrical connector when not in use. This enables preventing access to the electrical connector as long as an authorized user has not been successfully identified. This may be of great advantage since it may help reduce vandalism of the electrical connector.

In one embodiment, the protective cover is adapted for preventing infiltration of external elements such as debris, rain, ice, snow, and/or the like in the electrical connector, which may be of great advantage for reducing breaks and therefore down times during which the electrical connector is not operative. This may be even more advantageous when the electrical connector is used in harsh climatic conditions.

In one embodiment, the charging station comprises a flexible conductive cable provided with a connector adapted for operatively connecting with a corresponding connector provided on an electrical vehicle. The charging station comprises a receiving portion adapted for receiving the connector when not in use. The locking unit of the device for selectively enabling access to the electrical connector comprises a first protective cover covering the connector for selectively preventing access thereto and protecting it from surroundings. The locking unit further comprises a second protective cover for protecting the cable from surroundings when not in use.

In one embodiment, the device for selectively enabling access to the electrical connector further comprises a position sensor adapted for sensing presence and/or absence of the connector in the corresponding receiving portion for monitoring position of the connector. This may be of great advantage since it enables the encouraging of users to put the connector back in its receiving portion after use so that the device for selectively preventing access may monitor a return of the connector before the control unit terminates the user transaction.

In one embodiment, the electrical cable is retractably mounted to the frame of the charging station so that the electrical cable be retracted in its receiving portion after use of the electrical connector.

In accordance with another broad aspect, there is provided a method for charging an electric vehicle, comprising: at an electric vehicle charging station, verifying rights of a user to use the charging station for charging the electric vehicle;

upon successful verification, unlocking a locking unit mounted to a frame of the charging station and securing an electrical connector electrically connected to a source of electrical power in a receiving portion of the base structure, thereby providing the user access to the electrical connector; and the user electrically connecting a battery of the electric vehicle to the electrical connector, thereby charging the electric vehicle.

In one embodiment, the step of verifying the user's rights to use the charging station comprises verifying the user identity. In another embodiment, the step of verifying the user's rights comprises receiving a payment for the transaction, i.e. for the charge of the battery.

In one embodiment, the step of unlocking the locking unit comprises unlocking the locking mechanism operatively connected to a connector cover, thereby providing the user access to the electrical connector.

In one embodiment, the step of the user electrically connecting the battery comprises: the user opening the connector cover, electrically connecting the battery to the electrical connector, and closing the connector cover and providing electrical energy to the battery via the electrical connector.

In one embodiment the method further comprises the following steps:
- locking the connector cover during said providing electrical energy to the battery;
- unlocking the connector cover once the battery is recharged;
- said user disconnecting the battery and positioning the electrical connector back in the receiving portion;
- terminating the transaction only when the electrical connector has been positioned back in the receiving portion; and
- locking the connector cover.

BRIEF DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION

In the following description of the embodiments, references to the accompanying drawings are by way of illustration of an example by which the invention may be practiced. It will be understood that other embodiments may be made without departing from the scope of the invention disclosed.

There is disclosed a device for selectively enabling access to an electrical connector adapted for transferring energy to a battery powered device. Throughout the present description, the device for selectively enabling access will be described in a given application of a charging station having an electrical connector for electricity dispensing but the skilled addressee will appreciate that various other applications may be envisaged.

In one embodiment, the device enables preventing access to the electrical connector as long as a user has not been successfully identified. This may be of great advantage since it may help reduce vandalism of the electrical connector, as it will become apparent below to the skilled addressee.

As it will be understood upon reading of the present description, in one embodiment, the device may help ensuring the electrical connector is positioned back in a correct position after use. This may contribute to reduce damages caused to the electrical connector, which may be of great advantage. This may also help reducing down operating time of the whole system onto which the device is installed while also reducing maintenance costs, which may also be of great advantage.

Moreover, the device may also enable to enhance the comfort of the experience of the user, which may also be of great advantage.

In one embodiment, the device for selectively enabling access to the electrical connector is adapted for use in harsh climatic conditions, such as during winter in northern countries like Canada. As it will become apparent below, the construction of the device is devised to protect the electrical connector against heavy climatic conditions such as snow, ice and rain for example.

Moreover, in one embodiment, the device for selectively enabling access is further adapted for protecting the electrical connector against infiltration of various debris, which may be of great advantage for enhancing robustness of the electrical connector, as it will become apparent below.

Figure 1:
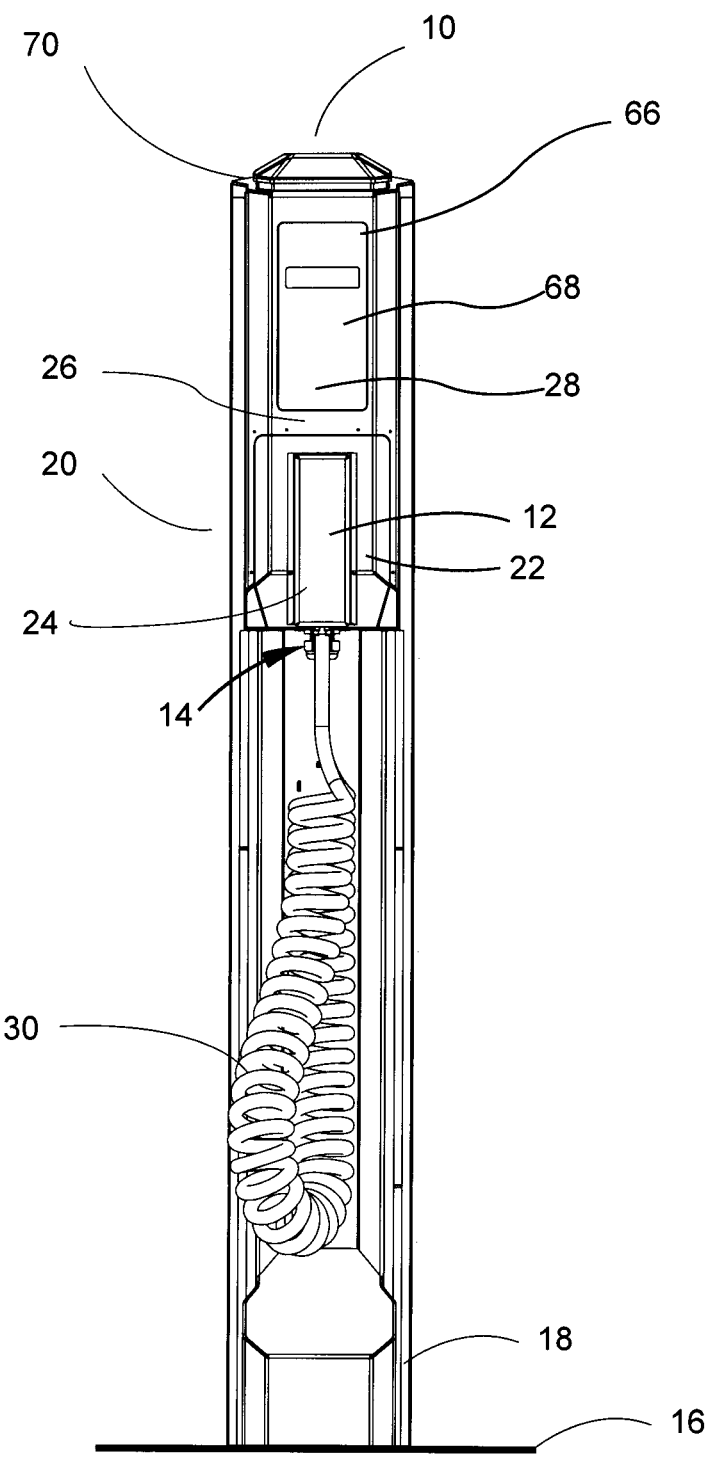
FIG. 1 is a front view of a charging station provided with a device for selectively enabling access to an electrical connector, according to one embodiment.

Referring to FIG. 1, there is shown a charging station 10 for providing electrical energy to an electrical vehicle. The charging station 10 comprises a device 12 for selectively enabling access to an energy providing means or electrical connector 14, also called a smart connector. The electrical connector 14 is adapted to connect to the electric vehicle to be charged, i.e. to a battery or a charger of the electrical vehicle.

The charging station 10 comprises a base 16 for anchoring the charging station 10 at a given location and a station frame 18 attachable to the base 16. The charging station 10 also comprises an electrical energy distributing unit 20 comprising the electrical connector 14 which is electrically connectable, via a switch, to an adequate source of electrical energy such as an electrical grid for example. The electrical connector 14 is adapted for selectively providing electrical energy to a battery powered device such as a vehicle in the described example.

The skilled addressee will understand that the charging station 10 may comprise electrical circuitry for converting the electrical current provided by the source of electrical energy to an electrical current adequate for charging the battery of the electrical vehicle. In this case, the electrical connector 14 is electrically connected to the electrical circuitry. Alternatively, the electrical circuitry may be located outside the charging station 10 so that the electrical current adequate for charging the battery of the electrical vehicle be directly provided to the charging station 10.

The frame 18 of the charging station 10 comprises a receiving portion 22 for receiving the electrical connector 14. In the embodiment illustrated in FIG. 1, the receiving portion 22 of the frame 18 comprises a recess portion shaped and sized to receive the electrical connector 14. It should be understood that any adequate receiving portion for receiving and holding the electrical connector 14 may be used. For example, the receiving portion 22 may be a hook secured to the frame 18 and to which the electrical connector 14 may be removably secured. In another embodiment, the receiving portion 22 may be a recess in the frame 18 having a substantially horizontal wall on which the electrical connector 14 may be laid down. In the illustrated example, the frame to which the electrical connector 14 is attached is the station frame 18 of the charging station 10 but the skilled addressee will appreciate that various other configurations may be considered for a given application.

The device 12 for selectively enabling access to the electrical connector 14 comprises a locking unit 24 mounted to the frame 18 and adapted for selectively providing a user access to the electrical connector 14, as it will be detailed below. Indeed, in one embodiment, the locking unit 24 comprises a door or cover pivotally secured to the frame 18 and a locking mechanism, which are operatively connected together so that the locking mechanism may lock the cover. The cover is movable between a closed position and an open position. The locking mechanism is adapted to lock the cover when in the closed position so that the cover may not be open by a user in order to prevent the user access to the electrical connector 14. When the cover is in the open position, the electrical connector 14 is accessible by the user who may remove the electrical connector 14 from the receiving portion 22. When the cover is in the closed position and the locking mechanism locks the cover, the electrical connector 14 is enclosed in the receiving portion between the frame 18 and the cover and cannot be removed therefrom. It should be understood that the cover is sized and shaped to cover the electrical connector 14 when in the receiving portion 22 so that the electrical connector cannot be removed from the receiving portion 22 by a user, thereby preventing physical access to the electrical connector 14. In other words, in this position, the user cannot be provided with electricity. While the present description refers to cover pivotally connected to the frame 18, other embodiments are possible. For example, the cover may slide with respect to the frame to form a sliding door and enclose the electrical connector 14 in the receiving portion 22.

In another embodiment, the locking unit 24 comprises a door or cover and a motor operatively connected together. In this case, the opening and closing of the cover are controlled by the motor so that a user may not manually open or close the cover. The locking unit 24 may further comprise a locking mechanism.

It should be understood that any adequate locking unit 24 adapted to prevent a user access to the electrical connector 14 may be used. For example, the locking unit 24 may comprise a motorized hook movable between a locked position and an unlocked position. The hook may be pivotally secured to the frame 18 for example. When in the locked position, the hook secures the electrical connector 14 to the frame 18 so that a user may not remove the electrical connector 14 from the receiving portion 22, thereby preventing the user access to the electrical connector 14. When in the unlocked position, the hook is away from the electrical connector 14 which is accessible to the user and may be removed from the receiving portion 22 of the frame 18. In a further example, the electrical connector 14 comprises a hole therethrough and the locking unit 24 comprises a motorized latch movably secured to the frame 18. When in a locked position, the latch extends through the hole of the electrical connector 14, thereby securing the electrical connector 14 to the frame 18 in the receiving portion thereof and preventing the user access to the electrical connector 14. When in an unlocked position, the latch is away from the electrical connector 14, thereby providing the user access to the electrical connector 14.

Still referring to FIG. 1, the device 12 for selectively enabling access to the electrical connector 14 also comprises a control unit 26 for controlling the locking unit 24. In one embodiment, the control unit 26 comprises a processing unit and a memory. The processing unit is configured for verifying rights of the user to access the electrical connector 14, and therefore charge the battery of his vehicle.

In one embodiment, the rights are considered as verified when a payment is done or to be done. For example, a cashier may provide the user access to the electrical connector 14 by remotely unlocking the locking unit 24. In this case, the control unit 26 receives an unlocking signal from the cashier. Upon reception of the unlocking signal, the processing unit understands that the user is authorized to use the electrical connector 14 and unlocks the locking unit 24.

In another example, the control unit 26 comprises a credit card reader and a communication unit operatively connected to the processing unit. The information about the user's credit card is provided by the credit card reader to the control unit 26 which transmits the credit card information to a remote server. The remote server validates the credit card information and returns a validation signal to the control unit 26. Upon reception of the validation signal, the processing unit understands that the user is authorized to use the electrical connector 14 and unlocks the locking unit 24.

In a further embodiment, the control unit 26 comprises an identification means 28 for identifying the user and providing the user access to the electrical connector 14 following a successful identification of the user, as it will be detailed below.

For example, a user may have to preregister before using the charging station 10 and is provided with an identification (ID). The ID may be a barcode, a radio-frequency identification (RFID) tag, a password, a conventional credit card, or the like. The control unit 26 comprises an adequate ID input device adapted to receive the user ID. For example, the ID input device may be a keyboard that may be used by the user to enter his password. In another example, the ID input device may be a barcode reader. In a further example, the ID input device may be an RFID tag reader.

The ID input device receives the user ID and transmits it to the processing unit. In one embodiment, a list of authorized users is stored on the memory of the control unit 26. The processing unit compares the user ID received from the ID input device to the stored list of authorized users to verify the user identity. Upon successful verification, the control unit 26 unlocks the locking unit 24. In another embodiment, the verification may be remotely performed on a server. In this case, the control unit 26 sends, via a communication unit, the user ID to a remote server which verifies the user identity.

Upon reception of a signal indicative of a successful verification from the remote server, the control unit 26 unlocks the locking unit 24.

In the illustrated embodiment, the charging station comprises a flexible conductive cable 30 having a first end (not shown) electrically connected to the source of electrical energy (not shown) and a second end electrically connected to the electrical connector 14.

In one embodiment, the flexible conductive cable 30 is firmly attached proximate its first end to the distributing unit 20 or the frame 18 of the charging station 10. In one embodiment, the conductive cable 30 has a helicoidal shape similar to a phone cable handset, although any other cable adapted for conducting the electrical energy may be used, as it will be apparent to the skilled addressee.

Figure 2:
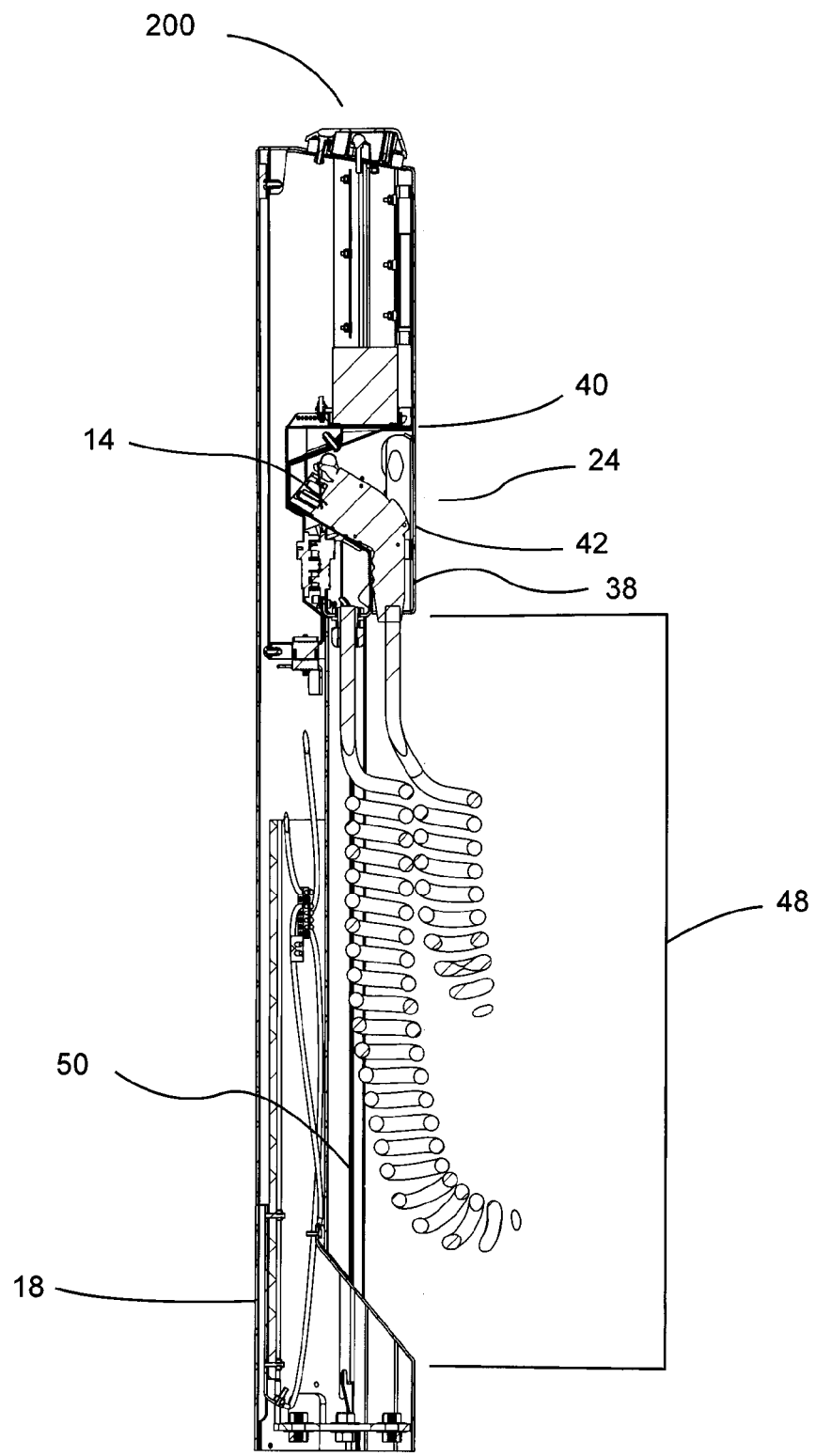
FIG. 2 is a cross sectional side view of another charging station provided with a device for selectively enabling access to an electrical connector, according to another embodiment, the locking unit being in a locked position.
Figure 3:
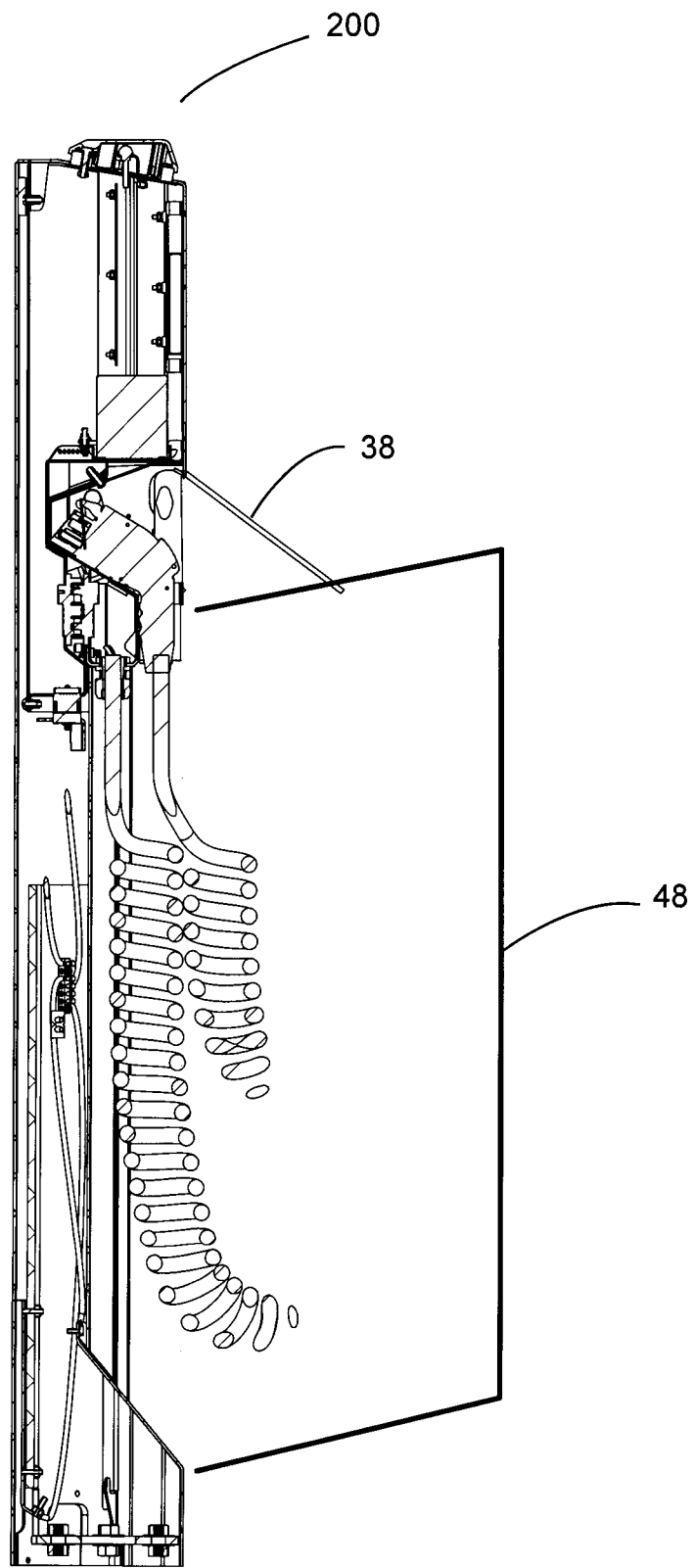
FIG. 3 is a cross sectional side view of the charging station shown in FIG. 2, the locking unit being in an unlocked position.
Figure 4:
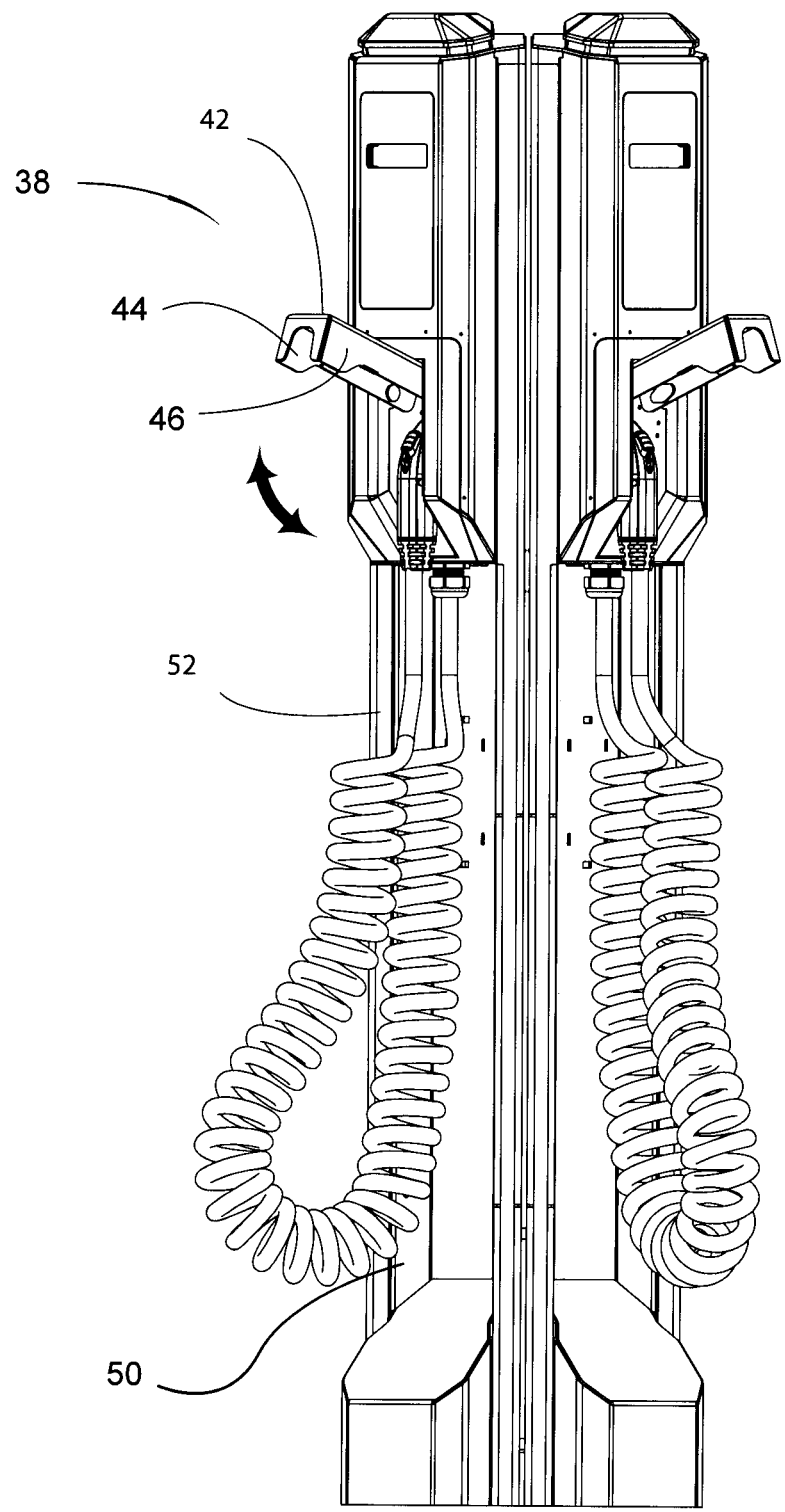
FIG. 4 is a front view of another charging station provided with two devices for selectively enabling access to an electrical connector, according to another embodiment.

FIGS. 2 to 4 illustrate another embodiment of a charging station 200 provided with a device 202 for selectively enabling access to an electrical connector.

Referring to FIGS. 2 to 4, in one embodiment, the locking unit 24 comprises a protective cover 38 covering the electrical connector 14 when the electrical connector 14 is not in use and is held in the receiving portion 22. As better shown in FIG. 4, in this embodiment, the protective cover 38 is pivotally connected to the frame 18 via an hinge 40 and is pivotable between a locked or closed position wherein the protective cover 38 extends substantially around the electrical connector 14 for preventing access thereto and an unlocked or open position wherein the protective cover 38 is pivoted upwardly for enabling access to the connector 32. In this position, the user may remove the electrical connector 14 from the receiving portion 22 and connect it to the vehicle for charging the batteries of the vehicle. It should be understood that any device for locking the protective cover 38 when in the closed position may be used.

As it will be appreciated by the skilled addressee, the protective cover 38 enables preventing access to the connector 14 as long as the control unit 26 has not verified the rights of a user to use the charging station 200.

In a further embodiment, the protective cover 38 is further adapted for preventing infiltration of debris, ice, snow, rain, and/or the like in the receiving portion 22 and eventually in or on the electrical connector 14. This may be of great advantage for reducing breaks and therefore down operating time during which the electrical connector 14 may not be operative. This may be particularly advantageous when the electrical connector 14 is used in harsh climatic conditions.

Still referring to FIGS. 2 to 4, in one embodiment, the protective cover 38 has a substantially cross-sectional U-shape. The protective cover 38 has a front face 42 devised to extend in front of the electrical connector 14 in the locked position. The protective cover 38 has also a first side face 44 and a second opposed side face 46, each devised to extend on a corresponding side of the electrical connector 14. As it will become apparent to the skilled addressee, in the locked position, the electrical connector 14 is enclosed in the receiving portion 22 between the protective cover 38 and the walls the charging station 10 and is therefore prevented from being removed from the receiving portion 22.

Although a hinged U-shaped cover has been described, it is worth mentioning that various other arrangements for preventing a removal of the electrical connector 14 when the locking unit 24 is in the locked position may be considered.

In a further embodiment, the locking unit 24 further comprises a cable protective cover 48 for protecting the conductive cable 30 from surroundings when not in use. As shown in FIGS. 2 to 4, in one embodiment, the frame 18 of the charging station 10 comprises a lower cable receiving portion 50 which is adapted to receive the conductive cable 30 when the electrical connector 14 is held in the receiving portion 22. In this embodiment, the cable protective cover 48 is pivotally connected to the frame 18 via an hinge 52 and is pivotable between a locked or closed position wherein the cable protective cover 48 extends in front of the conductive cable 30 and defines a closed area around the conductive cable 30 with the walls of the lower cable receiving portion 50 and an unlocked or open position wherein the cable protective cover 48 is pivoted sidewardly for providing access to the conductive cable 30. A locking mechanism (not shown) is operatively connected to the cable protective cover 48 for locking the cable protective cover 48 when in the closed position in order to prevent a user access to the conductive cable 30.

As it will be appreciated by the skilled addressee, the cable protective cover 48 enables preventing access to the conductive cable 30 as long as an the control unit 26 has not successfully verified the rights of a user to use the charging station for charging his vehicle.

In a further embodiment, the cable protective cover 48 is further adapted for preventing infiltration of debris and also of ice, snow, rain, and/or the like in the cable receiving portion 50. This may be particularly advantageous when the electrical connector 14 is used in harsh climatic conditions for preventing the conductive cable 30, and therefore the suit of the user, to be soiled by snow or debris. This may also be of great advantage for preventing theft of the conductive cable 30.

Although a hinged cable cover has been described, it is worth mentioning that various other arrangements for preventing a removal of the conductive cable 30 from the cable receiving portion 50 and protecting it when the locking unit 24 is in the locked position may be considered.

Figure 7A:
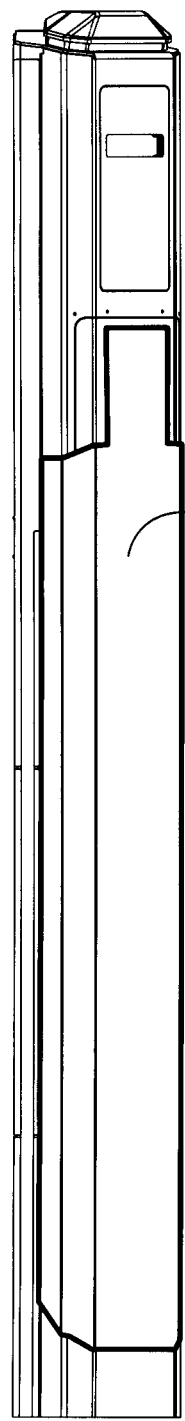
FIGS. 7A to 7C show another embodiment of a charging station provided with another device for selectively enabling access to an electrical connector, according to still another embodiment.
Figure 7B:
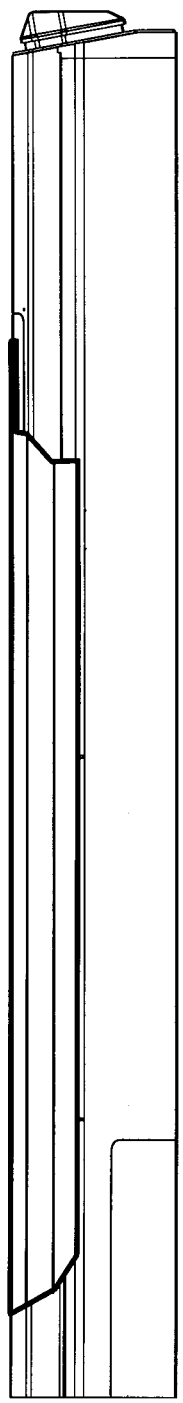
Figure 7C:
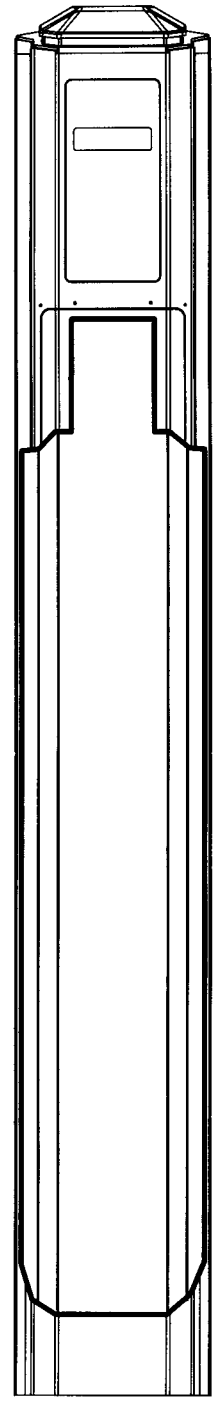

In one embodiment, the connector protective cover 38 and the cable protective cover 48 may be independent from each other, as described above, even if controlled simultaneously by the control unit 26. In another embodiment, the two covers 38 and 48 are integral together to form a single cover, such as the hinged door 700 illustrated in FIGS. 7A to 7C, for concurrently accessing both the electrical connector 14 and the conductive cable 30. The hinged door 700 may be sized and shaped to protect each of the electrical connector 14 and the conductive cable 30. A locking mechanism is present for locking the hinged door 700 as long as the control unit 26 has not verified the rights of a user to use the charging station. The cover may be operated like a door, with a vertical hinge for example. As previously mentioned, the skilled addressee will appreciate that various other arrangements may be considered, provided it prevents access to the electrical connector 14 in the locked position.

In another embodiment, the charging station does not comprise a flexible conductive cable 30. Instead, an electrical connector connected to a source of electrical energy is fixedly secured to the frame 18 in the receiving region 22. For example, the electrical connector may be an electrical plug (not shown). In this case, the user may use his own electrical cable to connect the battery of the vehicle to the electrical plug, as known to the skilled addressee. In this case, the protective cover 38 may be similar to the one previously described, except it is specifically sized and shaped to cover the plug and prevents a user from connecting a cable thereto.

Figure 5:
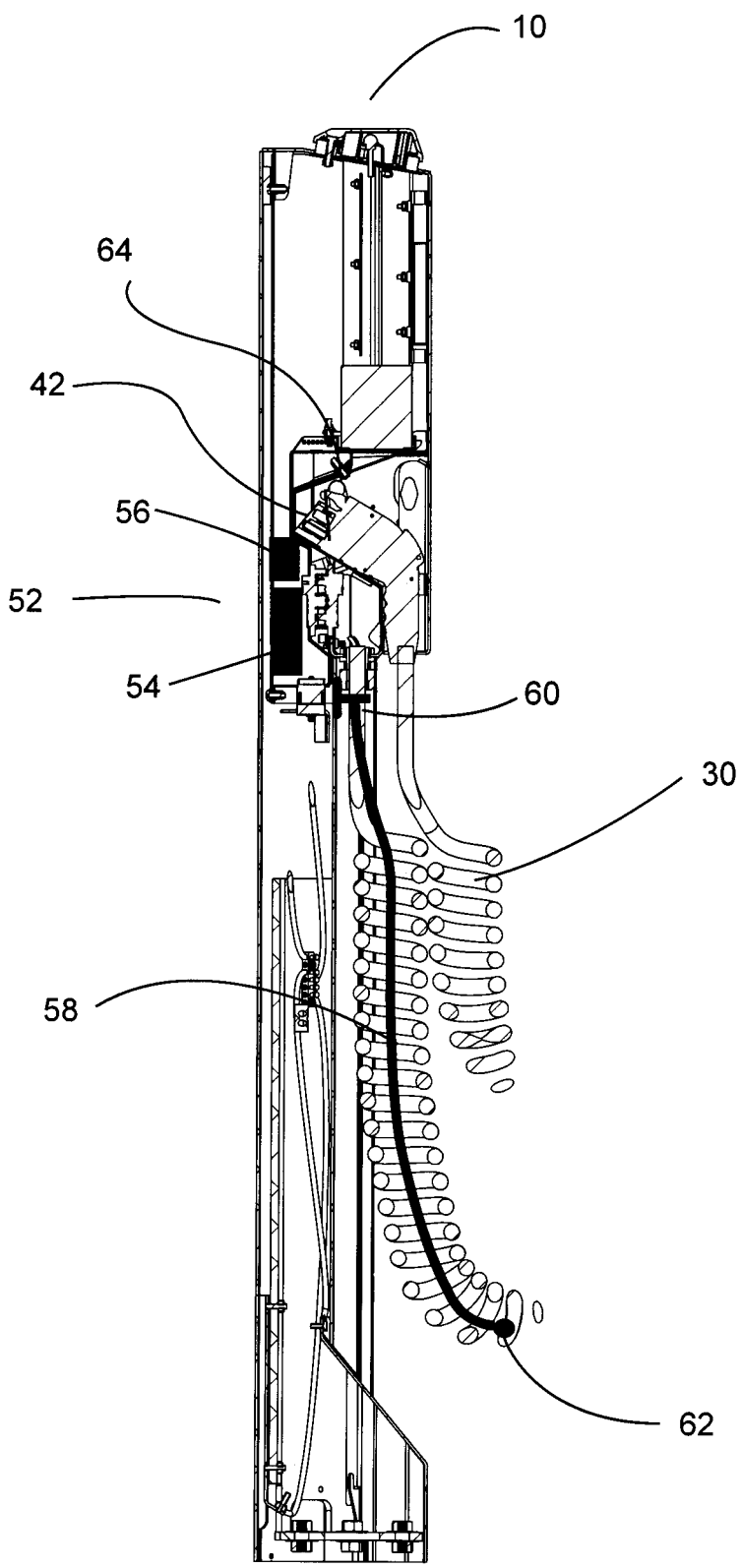
FIG. 5 is a cross sectional side view of another charging station provided with a device for selectively enabling access to an electrical connector, according to another embodiment.

Referring to FIG. 5, in a further embodiment, the flexible conductive cable 30 is retractably mounted with respect to the frame 18. This may help returning the conductive cable 30 in its initial position after use, i.e. in the cable receiving portion 50. Indeed, after use, the user will replace the electrical connector 14 in the receiving portion 50. The control unit 26 may detect that the user has finished his charging session and may operate a retracting mechanism 52 adapted for retracting the conductive cable 30 in the receiving portion 22.

In one embodiment, the retracting mechanism 52 comprises a motor 54 fixedly mounted to the frame 18 and a roller 56 driven by the motor 54. The retracting mechanism 52 further comprises a retracting cable 58, a steel cable for example, having a first end 60 connected to the roller 56 and a second end 62 attached to the conductive cable 30. In one embodiment and as illustrated, the retracting cable 58 may be attached to a middle portion of the conductive cable 30 although various other arrangements may be considered. The retracting cable 58 may be mounted inside the conductive cable 30 in one embodiment.

As previously mentioned, upon successful identification of the user, the control unit 26 will unlock the locking unit 24 for enabling access to the electrical connector 14. In the meantime, in this embodiment, the control unit 26 will release the retracting cable 58 for enabling a convenient use of the conductive cable 30 by the user. In other words, the roller 56 onto which the retracting cable 58 is rolled will be loosen in order to enable free unrolling of the retracting cable 58 when the user will pull the conductive cable 30. After use, the control unit 26 will operate the motor 54 to roll the retracting cable 58 on the roller 56. Thus, the conductive cable 30 will naturally return to its original position inside the cable receiving portion 50. This may be of great advantage since it may ensure that the conductive cable 30 is correctly replaced after use. It also enhances comfort of the user since he has not to manually place the conductive cable 30 in the receiving portion 50 himself. Moreover, with such a mechanism, the comfort of the next user will also be enhanced since the conductive cable 30 will be correctly placed and will not run on the floor and be soiled.

In the case where the charging station 10 is used in harsh climatic conditions, this may further enhance comfort of the users since the connector 32 should always be in its receiving portion 22 instead of running on the floor, in ice or snow. Moreover, in such conditions, ensuring the electrical connector 14 is not on the floor may also help reducing breaks caused by motorized snow removal.

It should be understood that any adequate device adapted to retract the conductive cable in its receiving portion may be used. For example, the retracting mechanism 52 may comprise no motor and the retracting cable may be an elastic cable, for example. In this case, the retracting mechanism may not be controlled by the control unit 26.

In a further embodiment, the device 12 for selectively enabling access to an electrical connector further comprises a position sensor 64 mounted proximate the receiving portion 22 and adapted for sensing presence and/or absence of the connector 14 in the corresponding receiving portion 22 of the charging station 10 in order to monitor the position of the connector 14. The control unit 26 is operatively connected to the position sensor 64 and may control a locking sequence of the locking unit 24 according to the repositioning of the connector 32 in its dedicated receiving portion.

In the same or another embodiment, the device 12 for selectively enabling access to an electrical connector comprises a cover position sensor adapted for determining whether the cover is closed and/or a lock position sensor adapted for determining whether the cover is locked. The control unit 26 is operatively connected to the cover position sensor and the lock position sensor. In one embodiment, the control unit 26 is adapted to terminate the transaction only if the cover position sensor indicates that the cover is closed and/or only if the lock position sensor determines that the cover is locked.

The skilled addressee will appreciate that various sensing devices may be used for detecting at least one of the presence and the absence of the electrical connector 14 in the receiving portion 22. For example, the position sensor 64 may be an optical position sensor, a mechanical position sensor, or the like.

The skilled addressee will also appreciate that the position sensor 64 may enable various locking sequences of the locking unit 24. For example, in one embodiment, once the control unit 26 has verified the user's rights to use the charging station, the locking unit 24 is unlocked. Then, the user operates the protective cover 38 in the open position, removes the connector 14 from the receiving portion 22, connects it to the vehicle, and operates the protective cover 38 back in the locked or closed position. In this embodiment, the control unit 26 detects the opening of the protective cover 38, the removal of the connector 14, and the closing of the protective cover 38. The control unit 26 will then begin transfer of energy and may also lock the protective cover 38 until the charge of the vehicle is finished. In one embodiment, the control unit 26 starts the transfer of energy only if the closing of the protective cover 38 has been detected to force the user to close the protective cover 38 after the removal of the electrical connector 14. Once the charge of the battery has been completed, the control unit 26 unlocks the protective cover 38 to enable the user to disconnect the battery and position the connector 32 back in the receiving portion 22. The control unit 26 does not terminate the operation of the user until the connector 32 is not returned in the suitable position, i.e. until the position sensor determines that the electrical connector has been adequately positioned in the receiving portion 22, in order to force the user to position the electrical connector 14 back in the receiving portion 22.

The skilled addressee will appreciate that various other operating sequences for the operation of the locking unit may be implemented.

In a further embodiment, additional sensors may be used for monitoring the closed position and the open position of the protective cover 38 and the closed position and the open position of the cable protective cover 48. This may enable implementing enhanced operating sequences for the locking unit.

In one embodiment, the control unit 26 may communicate with a user interface 66 mounted on the front face of the charging station 10. The user interface 66 may comprise a display 68 for displaying various information to the user, such as instructions for operating the charging station, the cost of the battery recharge, and the like, as well as a set of leds 70 used for providing visual indications such as the state of the charging station 10.

Figure 6:
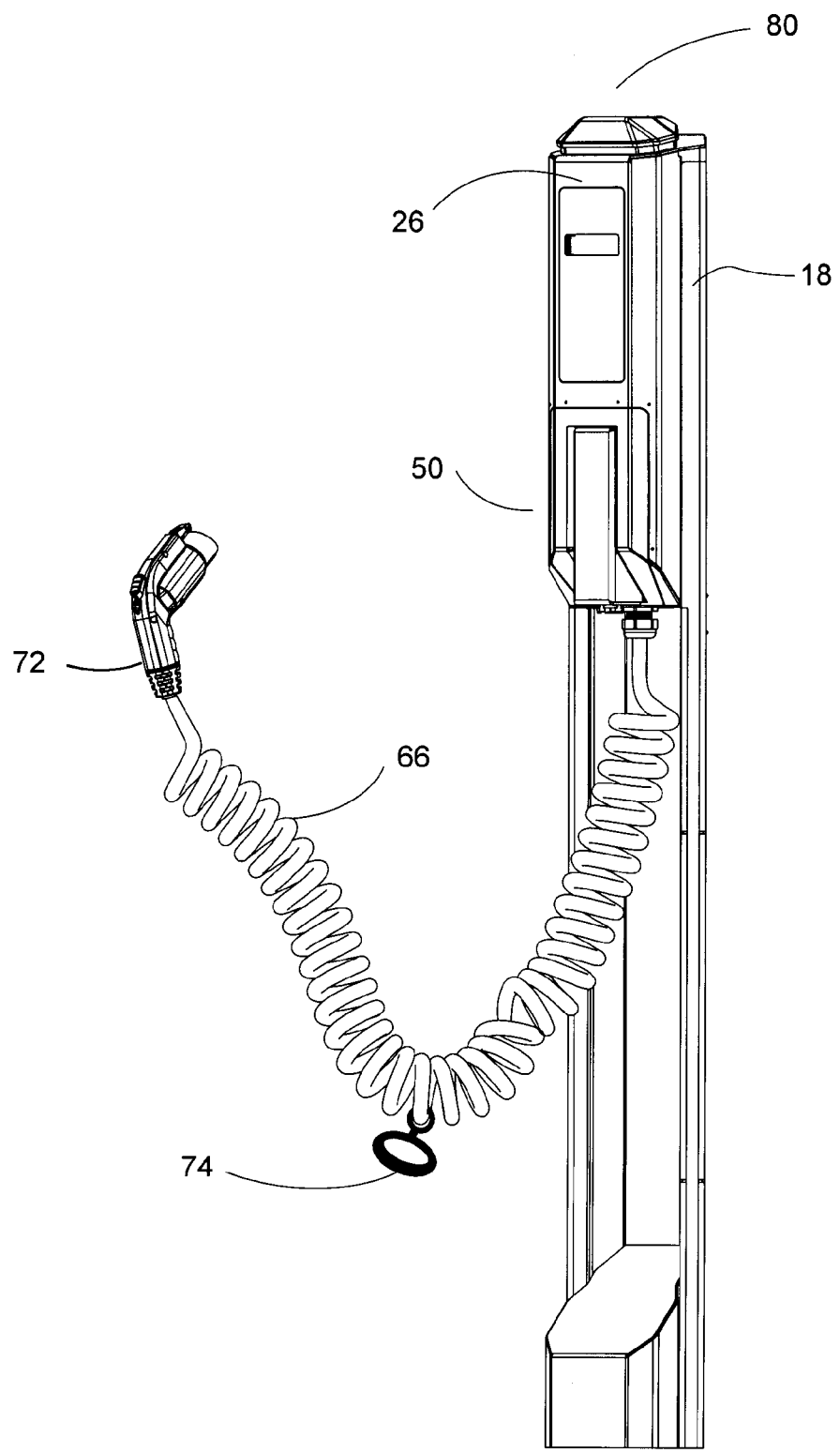
FIG. 6 is a perspective front view of another charging station provided with a device for selectively enabling access to an electrical connector, according to still another embodiment.

Referring to FIG. 6, in one embodiment, the electrical connector 14 comprises a handle 72 connected to the conductive cable 30 in order to provide an easy grip to the user. In one embodiment, the handle 72 is independent from the connector 32. In a further embodiment, an additional handle 74 may also be provided on the conductive cable 30 distal from the first handle 72 to further enhance manipulation of the conductive cable 30.

Still referring to FIG. 6, in one embodiment, the charging station 10 comprises a communication unit 80 mounted on the top of the control unit 26 or on the top of the frame 18. The communication unit 80 may comprise an antenna for enabling RF communication between the charging station 10 and the vehicle or a portable identification device for example. In a further embodiment, the communication unit 80 may enable a wireless communication over a network with a remote central control station operating a set of charging stations, as known to the skilled addressee. In one embodiment, the communication unit 80 may be used for updating the embedded software of the control unit 26.

The skilled addressee will appreciate that in one embodiment, the described charging station is well adapted for used in harsh climatic conditions. Indeed, the frame, the control unit and the distributing unit are mounted together using snuggly couplings between the elements. Moreover, covers are used to protect the elements of the electrical connector from surroundings. This may help preventing debris, sand and precipitation from accumulating inside the charging station. The communication unit which is installed on the top of the frame for enhancing communication may also be snuggly mounted with the frame for preventing unwanted insertion of debris in the charging station.

Although the above description relates to specific preferred embodiments as presently contemplated by the inventors, it will be understood that the invention in its broad aspect includes mechanical and functional equivalents of the elements described herein. Moreover, although the invention has been described in the particular application of electricity dispensing for electric or hybrid vehicles, it should be understood that the invention may be used in various other applications.

What is claimed is:

1. An electric vehicle charging station for charging an electric vehicle, comprising:
    an electrical connector electrically connectable to a source of electrical energy, the electrical connector adapted for connecting to a battery of the electric vehicle;
    an electrical cable having a first end connected to the electrical connector and a second end connectable to the source of electrical energy;
    a frame having a connector receiving portion for receiving the electrical connector; a locking unit mounted to the frame for preventing a user access to the electrical connector; the locking unit comprising a connector cover movable between a closed position in which the electrical connector is enclosed in the receiving portion to prevent the user access to the electrical connector, and an open position in which the electrical connector is accessible and removable from the receiving portion, and a connector locking mechanism for locking the connector cover when in the closed position, wherein the frame further comprises a cable receiving portion for receiving the electrical cable;
    a control unit operatively connected to the locking unit, the control unit for verifying rights of a user to access the electrical connector and unlocking the locking unit upon successful verification of the user rights to provide the user access to the electrical connector; and
    a cable cover pivotally secured to the frame adjacent to the cable receiving portion and movable between a first position in which the electrical cable is enclosed in the cable receiving portion to prevent the user access to the electrical cable, and a second position in which the electrical cable is accessible and removable from the cable receiving portion, and
    a cable locking mechanism controlled by the control unit for locking the cable cover when in the first position.

2. The electric vehicle charging station of claim 1, wherein the connector cover is shaped and sized to cover substantially an entirety of the electrical connector when inserted in the connector receiving portion.

3. The electric vehicle charging station of claim 2, wherein the connector cover is pivotally secured to the frame.

4. The electric vehicle charging station of claim 1, wherein the connector cover is integral with the cable cover.

5. The electric vehicle charging station of claim 1, wherein the electrical cable is retractably mounted to the frame in order to retract the electrical cable in the cable receiving portion of the frame.

6. The electric vehicle charging station of claim 5, further comprising a motor, a roller secured to the frame and drivable by the motor, and a retracting cable having a first end secured to the roller and a second end secured to the electrical cable, the motor being controlled by the control unit for rolling the retracting cable on the roller in order to retract the electrical cable in the cable receiving portion.

7. The electric vehicle charging station of claim 1, further comprising a position sensor for determining whether the electrical connector is positioned in the connector receiving portion, the control unit being connected to the position sensor and adapted to terminate a transaction for the user only when the position sensor determines that the electrical connector is positioned back in the connector receiving portion.

8. The electric vehicle charging station of claim 1, wherein the electrical connector is fixedly secured to the frame in the connector receiving portion.

9. The electric vehicle charging station of claim 1, wherein the control unit is adapted to identify the user and unlock the locking unit upon successful identification of the user.

10. A method for charging an electric vehicle, comprising:
    at an electric vehicle charging station, verifying rights of a user to use the charging station for charging the electric vehicle;
    upon successful verification, unlocking a locking unit mounted to a frame of the charging station, the locking unit preventing the user access to an electrical connector electrically connected to a source of electrical power and positioned in a receiving portion of the frame, thereby providing the user access to the electrical connector, said unlocking the locking unit comprising unlocking a locking mechanism operatively connected to a connector cover movable between a closed position in which the electrical connector is enclosed in the receiving portion, thereby preventing the user access to the electrical connector, and an open position in which the electrical connector is accessible and removable from the receiving portion;
    unlocking a cable cover locked in a first position by a control unit, the cable cover being pivotally secured to the frame adjacent to the cable receiving portion and movable between the first position in which the electrical cable is enclosed in the cable receiving portion to prevent the user access to the electrical cable, and a second position in which the electrical cable is accessible and removable from the cable receiving portion; and
    the user electrically connecting a battery of the electric vehicle to the electrical connector, thereby charging the electric vehicle.

11. The method of claim 10, wherein said verifying rights comprises identifying the user.

12. The method of claim 10, wherein said verifying rights comprises receiving a payment from the user.

13. The method of claim 10, wherein the step of the user electrically connecting the battery comprises:
    the user opening the connector cover, electrically connecting the battery to the electrical connector, and closing the connector cover; and
    providing electrical energy to the battery via the electrical connector.

14. The method of claim 13, further comprising:
locking the connector cover during said providing electrical energy to the battery;
unlocking the connector cover once the battery is recharged;
said user disconnecting the battery and positioning the electrical connector back in the receiving portion;
terminating an operation of the user only when the electrical connector has been positioned back in the receiving portion; and
locking the connector cover.

* * * * *